United States Patent [19]

McMurtrey

[11] Patent Number: 4,615,535
[45] Date of Patent: Oct. 7, 1986

[54] BICYCLE TRAINING WHEEL ASSEMBLY
[75] Inventor: David K. McMurtrey, Maysville, Ky.
[73] Assignee: Wald Manufacturing Company, Inc., Maysville, Ky.
[21] Appl. No.: 659,579
[22] Filed: Oct. 11, 1984
[51] Int. Cl.⁴ .............................................. B62H 1/10
[52] U.S. Cl. ................................................... 280/293
[58] Field of Search .............. 280/293, 289 R, 289 L, 280/294, 295, 297, 302, 303, 203

[56]  References Cited
U.S. PATENT DOCUMENTS

| 586,040 | 7/1897 | Judge | 280/293 |
|---|---|---|---|
| 2,530,498 | 11/1950 | Atwood et al. | 280/293 |
| 2,723,133 | 11/1955 | Pawsat | 280/293 |
| 3,401,954 | 9/1968 | Brilando | 280/293 |
| 3,642,305 | 2/1972 | Pawsat | 280/293 |

FOREIGN PATENT DOCUMENTS

| 689864 | 9/1930 | France | 280/293 |
|---|---|---|---|
| 483478 | 7/1953 | Italy | 280/293 |

Primary Examiner—John J. Love
Assistant Examiner—Everett G. Diederiks
Attorney, Agent, or Firm—Wood, Herron & Evans

[57] ABSTRACT

A training wheel assembly for children's bicycles includes an elongated bracket having a lower portion adapted to adjustably mount a training wheel, and an upper portion formed with multiple, vertically spaced hexagon-shaped apertures each adapted to receive the rear wheel axle of the bicycle. A brace arm is provided to assist in carrying torque applied to the bracket, and includes a hexagon-shaped projection at one end adapted to releasably lock within the hexagon-shaped apertures of the bracket, and a pair of spaced fingers at the other end adapted to mount to a frame member of the bicycle. The angular position of the brace arm relative to the bracket is adjustable so that the spaced fingers of the brace arm may be positioned to mount over and embracingly engage the rear fork member of varying configurations of forks of bicycles.

5 Claims, 3 Drawing Figures

BICYCLE TRAINING WHEEL ASSEMBLY

BACKGROUND OF THE INVENTION

This invention relates to training wheels for children's bicycles, and, more particularly, to a training wheel assembly which is vertically adjustable to accommodate different sized bicycles and which includes an adjustable torsion brace arm adapted to mount to various frame members at the rear of the bicycle.

Bicycle manufacturers often furnish training wheels on their smaller bicycles for children learning to ride. Due to the differences in design of the chain guard, rear fork and other frame members of bicycles sold by different manufacturers, training wheels designed for one bicycle often do not fit other bicycles. If training wheels are damaged, or removed from the bicycle and misplaced, it is often difficult to find replacement training wheels. It is uneconomical for retail bicycle outlets to stock training wheels for all types of bicycles, and many manufacturers do not sell replacement training wheels.

To overcome the problem, attempts have been made to design a universal training wheel assembly capable of mounting to a variety of bicycle designs. One example is shown in U.S. Pat. No. 3,642,305 which includes a bracket having a lower portion adapted to mount a training wheel and an upper portion formed with an elongated slot which receives the rear wheel axle. A torque arm extends perpendicularly from the bracket at the rear axle to the rear fork of the bicycle frame, which helps carry torsion applied to the training wheel assembly. One end portion of the torque arm is formed in a U-shape to receive the upper portion of the bracket. The opposite end of the torque arm is formed with spaced fingers which fit over the rear fork. A similar design is shown in U.S. Pat. No. 3,401,954, except the bracket and torque arm are formed in one piece, permanently perpendicular to one another.

Although the bicycle training wheel assemblies described above are adapted to mount to several bicycle designs, a problem arises in some bicycles where the rear fork of the bicycle frame is covered by the chain guard. Although the bracket may be mounted to the rear wheel axle, the torque arm extending perpendicularly from the bracket is blocked from the rear fork member by the chain guard in such bicycles. It is unacceptable to simply remove the torque arm in bicycle designs of this type since the bracket alone is not strong enough to resist torsional forces applied to it by the weight of the bicycle and rider, particularly in turns, and can turn and become loosened.

SUMMARY OF THE INVENTION

It is therefore among the primary objects of this invention to provide a bicycle frame assembly which is adapted to mount to virtually all bicycle designs and which is adjustable to accommodate bicycles of different size.

The training wheel assembly which accomplishes these objectives comprises an elongated bracket having a lower end portion adapted to mount a training wheel and an upper end portion having multiple, vertically spaced apertures formed in a hexagon shape. Each of the apertures is adapted to receive the threaded rear wheel axle of the bicycle, and the apertures are vertically spaced so as to accommodate bicycles of different height or size. In addition, the lower portion of the bracket is preferably formed with a vertical slot adapted to receive a mounting bolt for the training wheel so that the training wheel can be mounted to the bracket at the desired vertical location along the slot.

A torque or brace arm is adjustably mounted between the rear wheel axle and a frame member of the bicycle. A hexagon-shaped projection is extruded at one end of the brace arm forming an aperture adapted to align with the apertures of the bracket. The hexagon-shaped projection of the brace arm is adapted to be inserted within and mate with the hexagon-shaped apertures in the bracket to lock the brace arm in a desired angular position relative to the bracket. Both the bracket and torque arm are secured to the rear wheel axle by an axle nut. The opposite end of the brace arm is formed with a pair of spaced fingers which are adapted to straddle a frame member of the bicycle which is not obstructed by the chain guard. In some bicycle designs the rear fork members of the bicycle frame are unobstructed, but in other designs the brace arm must be mounted to a seat support post, a luggage support arm or other frame members not covered by the chain guard.

The adjustable locking connection between the brace arm and bracket enables the training wheel assembly of this invention to be mounted to virtually all bicycle designs. The angular position of the brace arm relative to the bracket is adjusted by simply disengaging the projection of the brace arm from an aperture in the bracket, moving the brace arm to a position where its forked end engages a frame member, and then inserting the projection of the brace arm back into an aperture of the bracket for mounting the bracket and brace arm to the rear wheel axle. The position of the brace arm relative to the bracket is thus not restricted to a 90° angle as in prior art designs, but is adjustable so that the brace arm can be positioned to enagage the rear fork, seat support posts or other frame members at the rear of the bicycle.

DESCRIPTION OF THE DRAWINGS

The structure, operation and advantages of this invention will become further apparent upon consideration of the following description taken in conjunction with the accompanying drawings, wherein.

DETAILED DESCRIPTION OF THE INVENTION

Figure 1:
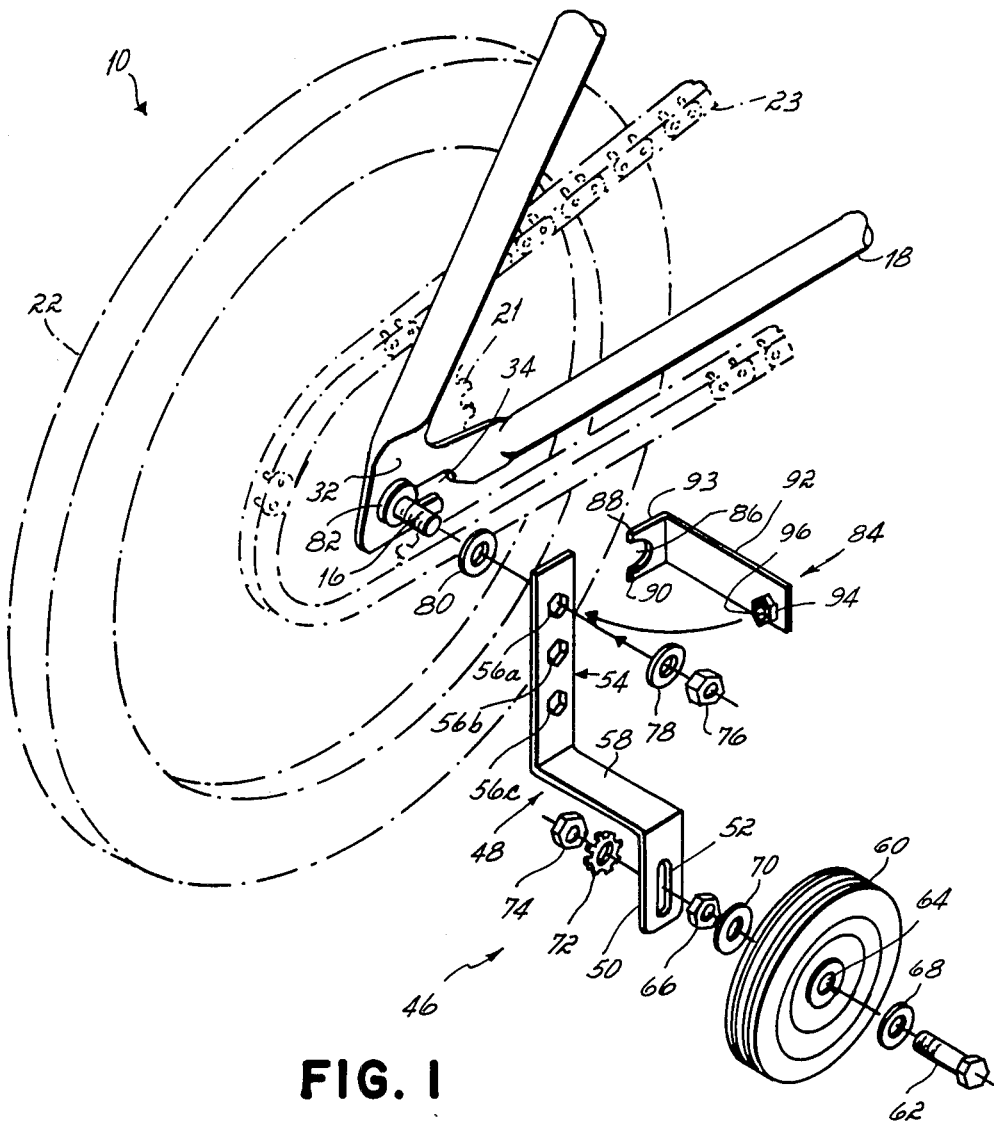
FIG. 1 is an exploded, perspective view of the training wheel assembly of this invention with the brace arm positioned to mount to the rear fork of one type of bicycle.
Figure 2:
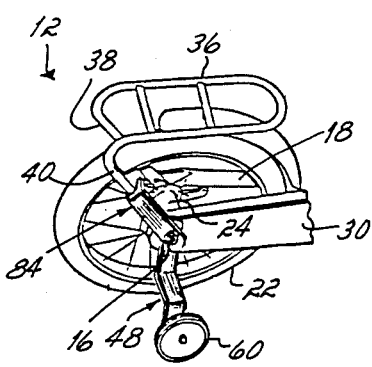
FIG. 2 is a perspective view of the training wheel assembly herein with the brace arm mounted to a support arm for a rear article carrier mounted at the rear of a bicycle.
Figure 3:
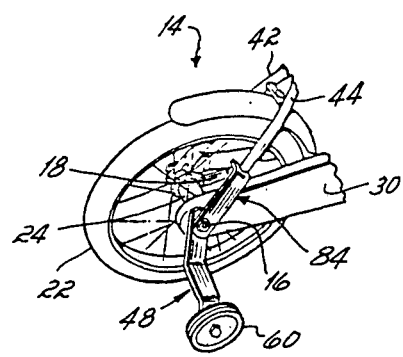
FIG. 3 is a perspective view of the training wheel assembly herein mounted to a seat support post of another bicycle design.

Referring now to the drawings, the rear portion of three bicycles 10, 12, 14 of slightly different design are illustrated in FIGS. 1, 2 and 3, respectively. Each of the bicycles 10, 12, 14 include a rear axle 16 threaded at each end which is adapted to span a pair of spaced, substantially parallel fork members 18 which form part of the bicycle frame. Supported between the fork members 18 by the rear axle 16, are the rear wheel 22, its hub 24, a chain drive sprocket 21, chain 23, and a chain guard 30. Each rear fork member 18 includes a substantially flat plate 32 which is formed with a slot 34 adapted to receive the threaded end of the rear wheel axle 16. The rear wheel axle 16 is adjustable along the length of the slot 34 to vary the tension of the drive chain in a well known manner.

The design of bicycles 10, 12 and 14 differs in that different frame members are accessible in the area of the rear wheel axle 16. For example, in the bicycle 12 shown in FIG. 2, the chain guard 30 extends to the rear wheel axle 16 and completely covers one of the rear fork members 18. The bicycle 12 includes a luggage or article support 36 having a pair of spaced support arms 38, 40 which are attached at opposite ends of the rear wheel axle 16 and are unobstructed by the chain guard 30. The bicycle 14 shown in FIG. 3 also includes a chain guard 30 which overlies one of the rear fork members 18. In this bicycle, the posts 42, 44 which support the bicycle seat (not shown) mount to opposite sides of the rear wheel axle 16 and are not covered by the chain guard 30. The bicycle 10 shown in FIG. 1 is a somewhat different design than either of the bicycles 12 or 14 because the chain guard (not shown) does not cover either of the rear fork members 18 in the area of rear wheel axle 16.

Referring now to FIG. 1, the training wheel assembly 46 of this invention is shown in an exploded view. As described below, the training wheel assembly 46 is adapted to mount to unobstructed frame elements of each of the bicycles 10, 12 and 14 shown in FIGS. 1-3 and provide a stable support for young children riding such bicycles. The training wheel assembly 46 is shown mounted to only one side of the bicycle 10, 12, 14, but of course the opposite side of each bicycle 10, 12, 14 also mounts an identical training wheel assembly 46.

The training wheel assembly 46 includes an elongated steel bracket 48 having a lower end portion 50 formed with a vertical slot 52, a middle portion 58 and an upper end portion 54 formed with three vertically spaced, apertures 56a, b, c. The apertures 56a, b, and c are all regular polygon-shaped and are, in the preferred embodiment, hexagon-shaped. The upper and lower end portions 50, 54 are formed at a right angle to the middle portion 58 of the bracket 48 and are thus substantially parallel to one another. The lower end portion 50 of bracket 48 is adapted to mount a training wheel 60. A bolt 62 extends through the center bore 64 of the training wheel 60 and is secured thereto by a nut 66. A pair of washers 68, 70 are preferably inserted on either side of the training wheel 60 between the head of the bolt 62 and the nut 66. The bolt 62 then extends through the vertical slot 52 in the lower end portion 50 and is secured thereto by a lock washer 72 and nut 74. The training wheel 60 is vertically adjustable relative to the lower end portion 50 of bracket 48 by moving it within the vertical slot 52 and securing it at the desired position therealong.

Each of the hexagon-shaped apertures 56a–c formed in the upper end portion 54 of bracket 48 are adapted to receive the rear wheel axle 16 to mount the bracket 48 thereto. The hexagon-shaped apertures 56a–c are vertically spaced along the upper end portion 54 of bracket 48 to accommodate bicycles of different size. For example, if used on small bicycles, the rear axle 16 is inserted through the lowermost aperture 56c, with the result that bracket 48 and in turn wheel 60 are moved upwardly relative to the rear wheel axle 16 and the rear wheel 22 of bicycle 10. Larger bicycles may be accommodated by using the other bores 56a, b spaced higher along the upper end portion 54 of bracket 48 so that the training wheel 60 is lowered with respect to the rear wheel axle 16 and the rear wheel 22. The bracket 48 is attached to the threaded end of the rear wheel axle 16 by a rear axle nut 76. A pair of washers 78, 80 may be disposed on either side of the bracket 48, and preferably a lock washer 82 is fitted over the rear wheel axle 16 and engages the flat plate 32 of rear fork members 18, 20.

As is well known, torsional forces are applied to the training wheel assembly 46 by the weight of the bicycle 10 and the rider, particularly in making turns. In order to prevent such torsional forces from being carried exclusively by the bracket 48, which could result in bending or loosening of the bracket 48, the training wheel assembly 46 herein includes a torque or brace arm 84. In accordance with an important aspect of this invention, the brace arm 84 is adapted to interlock with any one of the hexagon-shaped apertures 56a–c formed in the upper end portion 54 of bracket 48, and is also adjustable to various angular positions relative to the bracket 48.

The brace arm 84 is formed from a length of steel bar stock and includes an elongated portion 92 and an end portion 93 bent at an angle of about 90° relative to the elongated portion 92. The end portion 93 includes a U-shaped cutout 86 forming a pair of spaced fingers 88, 90. The end of brace arm 84 opposite end portion 93 is formed with a hexagon-shaped projection 94 adapted to mate with the hexagon-shaped apertures 56a–c in the upper end portion 54 of bracket 48. The hexagon-shaped projection 94 is preferably extruded from the steel bar stock forming brace arm 84, which in turn forms a bore 96 in the brace arm 84 aligning with projection 94. Alternatively, the bore 96 could be punched into the brace arm 84 and the projection 94 welded or brazed to the surface of the brace arm 84 about the bore 96. The bore 96 is adapted to receive the rear wheel axle 16.

As shown in FIG. 1, the training wheel assembly 46 is mounted to bicycle 10 by positioning brace arm 84 perpendicular to the upper end portion 54 of bracket 48 and then inserting its projection 94 into one of the hex-shaped apertures 56a–c in the upper end portion 54. Because both the projection 94 and apertures 56a-c are hexagon in shape, the brace arm 84 is prevented from rotating relative to the upper end portion 54. The bracket 48 and brace arm 84 are then placed over the rear axle 16, and as the bracket 48 and brace arm 84 engage the rear axle 16, the spaced fingers 88, 90 of the brace arm 84 straddle and engage a rear fork member 18 of the bicycle 10. The bracket 48 and brace arm 84 are secured to the rear axle 16 and rear fork member 20 by the rear axle nut 76. Torsional forces imposed on the bracket 48 as the training wheel 60 contacts the road, particularly in turns, are thus transmitted to the brace arm 84 which helps to prevent turning and loosening of bracket 48.

The position of brace arm 84 in FIG. 1 is intended to accommodate the particular design of bicycle 10. However, in the bicycles 12 and 14 shown in FIGS. 2 and 3, one of the rear fork members 18 is covered by the chain guard 30 which obstructs the brace arm 84 from mounting to rear fork member 18. In order to allow training wheel assembly 46 to be adapted for bicycles 12 and 14, the brace arm 84 is movable to different angular positions relative to the bracket 48.

Referring to FIG. 2, one of the rear fork members 18 is covered but the support arms 38, 40 for the article support 36 are unobstructed. To accommodate this bicycle 12, the brace arm 84 is aligned with the support arms 40 and then its projection 94 is inserted into an appropriate hex-shaped aperture 56*a-c* formed in the upper end portion 54 of bracket 48. The spaced fingers 88, 90 of brace arm 84 thus engage the support arm 40 when the bracket 48 and brace arm 84 are mounted to rear wheel axle 16. This permits the brace arm 84 to carry at least part of the torque applied to bracket 48 without being connected to either rear fork member 18.

In the bicycle 14 shown in FIG. 3, the chain guard 30 covers one of the rear fork members 18 and no article support 36 is included. However, the posts 42, 44 which support the bicycle seat (not shown) are unobstructed. To mount training wheel assembly 46 to bicycle 14, the brace arm 84 is first positioned to align with post 44 and its projection 94 is then inserted into one of the apertures 56*a-c* of bracket 48 in preparation for mounting to the rear wheel axle 16.

The training wheel assembly 46 of this invention is therefore suitable for use on a variety of bicycle designs. The brace arm 84 is adjustable at a variety of angular positions relative to the bracket 48 so as to mount to rear fork members 18, seat support posts 42, 44 or the support arms 38, 40 of an article support 36. At each angular position of the brace arm 84 relative to the bracket 48, the hexagon-shaped projection 94 of brace arm 84 locks within the hex-shaped apertures 56*a-c* of bracket 48 to prevent rotation of the brace arm 84 relative to the bracket 48. In addition, the vertically spaced apertures 56*a-c* formed in bracket 48 allow the training wheel 60 to be positioned at varying heights relative to the rear wheel axle 16 to accommodate bicycles of different size. The vertical adjustment of the training wheel 60 relative to the bracket 48 provides still further flexibility in the use of this invention on a wide variety of bicycles.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For example, a projection could be formed on the upper end portion 54 of bracket 48 at each of the apertures 56*a-c*, which would be adapted to mate with the hex-shaped bore 96 formed in brace arm 84. This configuration is simply the reversal of that shown in the drawings. Therefore, it is intended that the invention not be limited to the particular embodiment disclosed as the best mode contemplated for carrying out this invention, but that the invention will include all embodiments falling within the scope of the appended claims.

What is claimed is:

1. A training wheel assembly adapted to mount a training wheel to bicycles having a rear wheel axle and differing configurations of rear frame members, said assembly comprising:

an elongated bracket having a lower end portion mounted to said training wheel, and an apertured upper end portion adapted to be mounted over a rear wheel axle of a bicycle;

a brace arm having an aperture in one end adapted to be mounted over said rear wheel axle, said brace arm having an opposite end formed with a slot defined between a pair of spaced fingers, said fingers being adapted to embracingly engage a rear frame member of a bicycle;

mounting means for non-rotatably securing said brace arm to said elongated bracket, said mounting means being adjustable to vary the angular position of said brace arm relative to said bracket so as to align said spaced fingers of said brace arm with varying angular position rear frame members; and said mounting means comprising at least one regular polygon-shaped aperture formed in one of said upper end portion of said bracket and said brace arm, and a regular polygon-shaped projection extending outwardly from the other of said upper end portion of said bracket and said brace arm, said projection being adapted to be inserted within said aperture to prevent rotation of said brace arm relative to said bracket, the angular position of said brace arm relative to said bracket being adjustable for mounting said spaced fingers to a frame of a bicycle by removing said projection from said aperture, rotating said brace arm to align said spaced fingers thereof with the frame member and then reinserting said projection within said aperture.

2. The training wheel assembly of claim 1 in which said bracket is formed with multiple, vertically spaced apertures, each of said apertures being adapted to be mounted over said rear axle of a bicycle.

3. The training wheel assembly of claim 1 in which said upper portion of said bracket is formed with said aperture and said brace arm is formed with said projection.

4. The training wheel assembly of claim 1 in which said lower portion of said bracket is formed with a vertical slot, said training wheel being mounted to said bracket with a bolt insertable through said training wheel and into said vertical slot, and a nut adapted to be tightened onto said bolt, the vertical position of said wheel relative to said bracket being adjustable by moving said bolt along the length of said vertical slot.

5. A training wheel assembly adapted to mount a training wheel to bicycles having a rear wheel axle and differing configurations of rear frame members, said assembly comprising:

an elongated bracket having a lower end portion adapted to mount said training wheel, and an upper end portion formed with regular, polygon-shaped apertures;

a brace arm formed with a slot defining a pair of spaced fingers adapted to embracingly engage one of said rear frame members, and a regular, polygon-shaped projection extnding outwardly from a bore formed in said brace arm;

said projection of said brace arm being insertable within said apertures of said bracket to prevent rotation of said brace arm relative to said bracket, the angular position of said brace arm relative to said bracket being adjustable by disengaging said projection from said aperture, rotating said brace arm so that said spaced fingers align with said rear frame member, and reinserting said projection of said brace arm within one of said apertures of said bracket.

* * * * *